UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

PLASTIC COMPOSITION.

1,317,204.  Specification of Letters Patent.  Patented Sept. 30, 1919.

No Drawing.  Application filed April 12, 1915. Serial No. 20,750.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Plastic Compositions, of which the following is a specification.

My invention relates to plastic compositions, and it has for its object to prepare plastic compositions from varnish gums as shellac, copal, and the like which are brittle and must ordinarily be handled in alcoholic or oil solutions.

I have discovered that certain varnish gums, notably shellac, may be rendered flexible or even fluid by the addition of naphthalene, naphthols or derivatives of these bodies other than chloro-naphthalene. The naphthalene bodies act as solid solvents for the shellac, and, when very volatile naphthalene bodies are used, such as naphthalene itself, shellac can be made to flow when heated, the liquid being almost as mobile as water. The mixture of shellac and naphthalene or naphthalene derivatives other than chloro-naphthalene may be used with advantage for many purposes.

The foregoing method of treating shellac and other gum facilities their use as agents for impregnating fibrous material such as paper, cloth and the like. Paper and cloth impregnated with shellac are largely used for electrical insulating purposes and impregnating liquids for this purpose have heretofore been made either by mixing shellac with oil, which is a difficult matter, or by dissolving the shellac in wood alcohol. The latter practice is usually followed, and it is found that the presence of wood alcohol, which can be completely removed from the shellac only with great difficulty, lessens the dielectric strength of the product.

Shellac-naphthalene mixtures prepared in accordance with my invention may be reduced to liquid form by simple heating, and paper, cloth and other absorbent materials may be readily impregnated with the resulting liquid. If desired, the fabric may be subjected to heat treatment after being impregnated, in order to remove the naphthalene body either partly or entirely.

Another valuable application of mixtures of shellac with naphthalene, naphthols and the like is in the manufacture of flexible built-up mica sheets and molded mica articles. For this purpose, shellac and naphthalene may be ground together or may be ground separately and then mixed, and the resulting powder used as a bond for uniting mica flakes, by means of any usual or convenient mica-building apparatus; or a similar bond may be made by first preparing a solid solution of naphthalene and shellac and then grinding the solid mass to powder without the application of heat. Composite mica sheets prepared with either of these binders may be finished by placing them for a short time between heated plates or in heated molds, and it is found that the resulting product is distinctly flexible and is thereby distinguished from the built-up mica bodies that have heretofore been made. Inert materials other than mica may be agglomerated by means of my shellac-naphthalene binders, and flexible compositions thereby produced. Asbestos, silica and wood flour are examples of filling materials that may be so used.

The proportions in which shellac and naphthalene or naphthalene derivatives other than chloro-naphthalene may be mixed together may be varied within wide limits. One mixture with which I have obtained good results in preparing flexible mica plates is composed of substantially 90% of shellac and substantially 10% of naphthalene. The mica plates or other bodies prepared with this mixture as a binder should be heated only sufficiently to thoroughly melt the binder and unite the flakes, because longer heating will expel some or all of the naphthalene and will consequently impair the flexibility of the product.

If permanently flexible products are required, I prefer to use naphthols or other naphthalene derivatives rather than naphthalene itself, since they are not volatilized from the shellac on heating. Such products may be repeatedly heated and cooled without losing their flexibility.

It is obvious that the products which I have discovered may be used for many other purposes than those which I have specifically mentioned, and it is therefore to be understood that my invention comprehends all such modifications and adaptations as fall within the scope of the appended claims.

I claim as my invention:

1. A plastic composition comprising shellac and naphthalene.

2. A plastic composition comprising a natural varnish gum and naphthalene.

3. A plastic composition comprising shellac, a filler, and naphthalene.

4. A plastic composition comprising shellac, mica flakes and naphthalene.

In testimony whereof, I have hereunto subscribed my name this 30th day of March, 1915.

JAMES P. A. McCOY.